T. W. MORRIS.
INNER TUBE TIRE MOLD.
APPLICATION FILED MAY 14, 1915.
1,188,091.
Patented June 20, 1916.
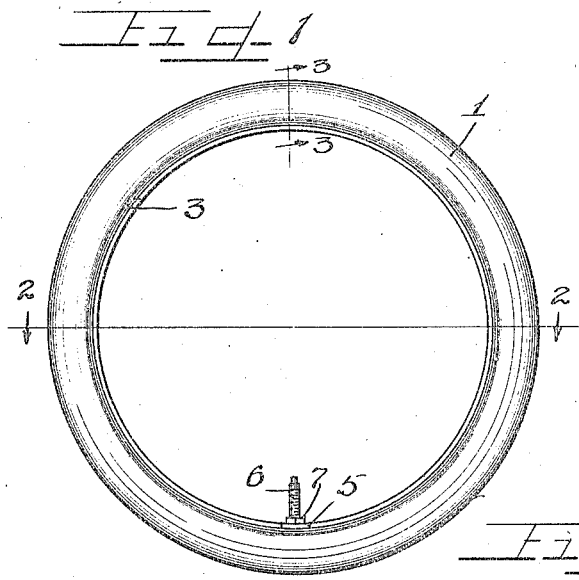
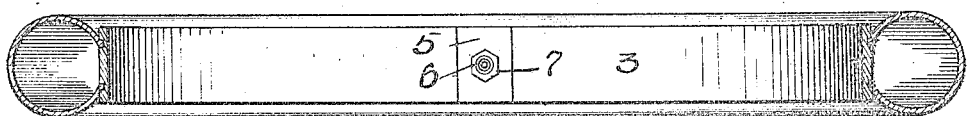
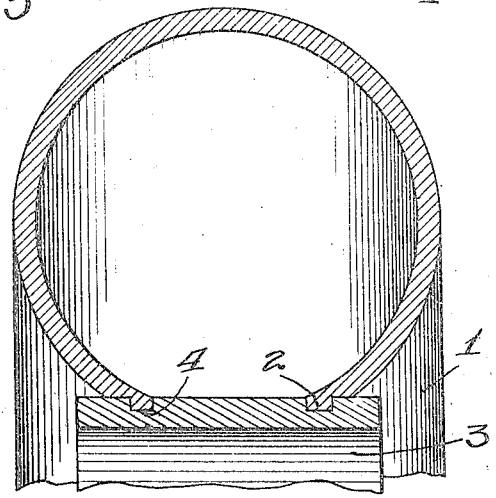

UNITED STATES PATENT OFFICE.

THOMAS W. MORRIS, OF CHICAGO, ILLINOIS, ASSIGNOR OF ONE-HALF TO GEORGE B. DRYDEN, OF CHICAGO, ILLINOIS.

INNER-TUBE TIRE-MOLD.

1,188,091.  Specification of Letters Patent.  Patented June 20, 1916.

Application filed May 14, 1915. Serial No. 27,970.

*To all whom it may concern:*

Be it known that I, THOMAS W. MORRIS, a citizen of the United States, and a resident of the city of Chicago, in the county of Cook and State of Illinois, have invented certain new and useful Improvements in Inner-Tube Tire-Molds; and I do hereby declare that the following is a full, clear, and exact description of the same, reference being had to the accompanying drawings, and to the numerals of reference marked thereon, which form a part of this specification.

Heretofore it has been the practice in the manufacture of inner tubes for automobile tires, to form the same into long straight tubes, which are cut into desired lengths and vulcanized to make the same air proof. After which process, the tubing is bent into circular form, the intersecting ends thereof being either cemented, vulcanized, or cemented and vulcanized together to form a finished inner tube. This process has however proven unsatisfactory, for the reason that the inner periphery of the tubes thus formed is cramped, while the outer periphery of the tube is stressed under tension.

The above mentioned process has, however, been improved upon, and inner tubes are now manufactured in standard circular tire forms, after which they are placed in molds comprising sections adapted to be fastened together. The tubes vulcanized in sectional molds of this type have invariably formed on the outer side surfaces thereof, ridges, caused by the hot material, during the process of vulcanization, flowing into the grooves formed by the intersection of the mold sections. The ridges thus formed on the exterior sides of inner tubings are, of course, objectionable, since they may prove a constant source of trouble and annoyance by inducing wear and heating within a tire casing.

This invention therefore, relates to an improved inner tube mold construction in which the mold consists of but a single annular section, and an interfitting split rim member, so formed to eliminate the objectionable inner side grooves, and permitting the manufacture of an inner tube free from side or top ridges thus presenting a smooth outer surface to the interior of the tire casing in which they are to be used.

It is an object of this invention to construct an inner tube vulcanizing mold wherein but a single annular casing is used in connection with a split inner peripheral rim.

It is also an object of this invention to construct an inner tube vulcanizing mold in which the annular casing is provided with tongues on its inner periphery arranged to interfit a grooved split ring member.

It is furthermore an object of this invention to construct an inner tube vulcanizing mold consisting of a single annular casing having integral tongues arranged to interfit a grooved split band section, providing an even and smooth interior surface for the production of inner tubes free from ridges on the sides or on the outer periphery thereof.

It is finally an object of this invention to construct a resilient inner tube tire mold comprising an interfitting annular casing and a split rim, and a plate adapted to be sprung into the rim member to maintain the mold assembled.

The invention (in a preferred form) is illustrated in the drawings and hereinafter more fully described.

In the drawings: Figure 1 is a side view of a mold, showing the inner tube valve stem projecting therethrough. Fig. 2 is a section on line 2—2, of Fig. 1, with the inner tube omitted. Fig. 3 is an enlarged detail section on line 3—3 of Fig. 1, with the inner tube omitted.

As shown on the drawings: the vulcanizing mold consists of an annular casing 1, having tongues 2, formed integral with the edges thereof. Mounted on the inner periphery of casing 1, is a split rim 3, having a pair of parallel grooves 4, formed on the outer periphery of said rim, to receive the tongues 2, and fitting evenly within said casing to produce a smooth inner mold surface substantially free from grooves. In order that the casing 1, and said rim 3, may be tightly assembled with one another, an apertured clamping plate 5, is provided to receive a valve stem 6, of an inner tube therethrough. Said plate 5, is sprung into the gap between the ends of the rim 3, and is firmly held in place by a nut 7 which is threaded upon the valve stem 6, which projects through the aperture in said plate, thus expanding the rim 3, to produce a tight fit between the mold members.

The operation is as follows: When it is desired to vulcanize an inner tire tube, the rim 3, is removed from the casing 1, and the tube is inserted into the metal casing. The mold is then assembled by placing the rim 3, with the tongues 2, of the casing, fitting into grooves 4, and the split portion of said rim 3, is positioned to allow the valve stem 6, to project therethrough. The clamping plate 5, inserted over the valve stem is then sprung into place in the rim 3, and tightly forced into place and securely held by means of the nut 7. The mold containing the tube may then be heated by any desired method thus vulcanizing the tube and producing a finished vulcanized inner tire tube free from objectionable side or top ridges or beads. In order that the tube may tightly fit against the inner surface of the mold during the process of vulcanization, air and a small quantity of water may be introduced into the tube, which upon the application of heat, produce steam and a pressure sufficient to expand the tube into the proper position within the mold.

I am aware that various details of construction may be varied through a wide range without departing from the principles of this invention. I therefore do not purpose limiting the patent granted otherwise than necessitated by the prior art.

I claim as my invention:

1. In a tube mold of the class described, a unitary annular casing, a rim engaged therewith, and resilient means adapted to be sprung into said rim to lock said casing and rim together.

2. In a device of the class described, a vulcanizing tube mold, comprising a casing, integral tongues thereon, an inner rim having grooves therein, said casing and rim adapted to interfit one another.

3. In a device of the class described, a vulcanizing mold, comprising a casing, a split rim adapted to fit on the inner periphery thereof, and a clamping plate adapted to be sprung into said rim to firmly hold said casing and rim together.

4. In a vulcanizing mold of the class described, an annular casing, tongues integral therewith, a split annular rim having grooves on the outer circumference thereof adapted to receive said tongues, and a plate adapted to be inserted between the ends of said rim to securely hold said casing and rim together.

5. In a vulcanizing mold of the class described, a seamless unitary casing, an expansion band having grooves therein adapted to receive the edges of said casing engaged in said grooves, and a clamping plate to hold said band firmly braced against said casing.

6. In a device of the class described, a circular casing having an endless inner peripheral opening, tongues formed integral with the edges thereof, and closure means for said casing having grooves therein permitting said tongues to lockingly engage in said grooves.

7. In a vulcanizing mold of the class described, a circular casing having an opening to receive a circular tire tube, a laterally split expansion band having a plurality of grooves therein adapted to permit said casing to engage with said band and interfit into said grooves.

8. In a device of the class described adapted to receive an inner tube and its valve, of means coacting with said valve to hold said device assembled.

9. In a device of the class described, a vulcanizing mold, comprising a casing, a split rim adapted to fit on the inner periphery thereof, an apertured clamping plate adapted to be sprung into said rim to firmly hold said casing and rim together, and means for removably holding said plate in position in said rim.

In testimony whereof I have hereunto subscribed my name in the presence of two subscribing witnesses.

THOMAS W. MORRIS.

Witnesses:
CHARLES W. HILLS, Jr.,
LEON M. REIBSTEIN.